(12) United States Patent
Fuller et al.

(10) Patent No.: US 7,659,319 B2
(45) Date of Patent: Feb. 9, 2010

(54) SULFONATED POLY(PHENYLENE SULFIDE) FILMS AS POLYELECTROLYTE MEMBRANES

(75) Inventors: Timothy J. Fuller, Pittsford, NY (US); Beba T. Dobulis, Fairport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/467,670

(22) Filed: May 18, 2009

(65) Prior Publication Data

US 2009/0226791 A1 Sep. 10, 2009

Related U.S. Application Data

(62) Division of application No. 11/053,434, filed on Feb. 8, 2005, now Pat. No. 7,601,449.

(51) Int. Cl.
*B01J 39/20* (2006.01)
(52) U.S. Cl. .............................. 521/27; 521/30; 521/33
(58) Field of Classification Search .................. 521/27, 521/30, 33
See application file for complete search history.

(56) References Cited

U.S. PATENT DOCUMENTS

| 3,919,177 | A | 11/1975 | Campbell |
| 5,625,002 | A | 4/1997 | Kadoi et al. |
| 2002/0045085 | A1 | 4/2002 | Formato et al. |
| 2004/0054125 | A1 | 3/2004 | Schindler et al. |
| 2004/0072045 | A1 | 4/2004 | Kuromatsu et al. |
| 2004/0146766 | A1 | 7/2004 | Li et al. |
| 2004/0236038 | A1 | 11/2004 | Lee et al. |

*Primary Examiner*—Bernard Lipman
(74) *Attorney, Agent, or Firm*—Harness, Dickey & Pierce, P.L.C.

(57) ABSTRACT

Proton conducting membranes are made of sulfonated films comprising poly(arylene sulfide), an olefinic polymer, and an elastomer. They are used in PEM fuel cells operating at temperatures above 95° C., or at low relative humidity. According to methods of the invention, sulfonated poly(phenylene sulfide) (SPPS) films are provided with a wide range of physical properties, which depend in part on the ion exchange capacity of the films. In particular, the degree or level of sulfonation can be tailored by adjusting reaction conditions such as temperature and time.

18 Claims, 1 Drawing Sheet

SULFONATED POLY(PHENYLENE SULFIDE) FILMS AS POLYELECTROLYTE MEMBRANES

CROSS-REFERENCE TO RELATED APPLICATIONS

This application is a divisional of U.S. patent application Ser. No. 11/053,434 filed on Feb. 8, 2005, now U.S. Pat. No. 7,601,449. The entire disclosure of the above application is incorporated herein by reference.

INTRODUCTION

The present invention relates to polyelectrolyte membranes and their use as proton exchange membranes in fuel cells. More particularly, the invention relates to treatment of poly(phenylene sulfide) films to provide a polyelectrolyte for fuel cell applications.

Fuel cells are increasingly being used as power sources for electric vehicles and other applications. An exemplary fuel cell has a membrane electrode assembly with catalytic electrodes and a membrane formed between the electrodes. Hydrogen fuel is supplied to the anode side of the assembly, while oxygen is supplied to the cathode. The membrane provides an electrical connection between the anode and cathode, and provides a medium through which fuel oxidation products are transported from the anode to combine with the reduced oxygen at the cathode. The overall reaction in the fuel cell is the combination of hydrogen and oxygen to yield water and an electromotive potential. Because the oxidation product of the fuel is essentially $H^+$ or a proton, the polyelectrolyte membrane is also known as a proton conducting membrane or a proton exchange membrane (PEM).

Water management is important in a PEM fuel cell. A proton must be hydrated to pass through the proton exchange membrane to combine with oxygen at the cathode. According to various models, 7 to 11 water molecules are needed to account for the transport of one proton through the membrane. It has been observed that when relative humidity in the fuel cell is low, proton transport is less efficient and the current available from the cell is reduced. To avoid this, it is possible to humidify fuel cells to prevent the membranes from drying out. However, as temperature of fuel cell operation increases, pressurization may be necessary which leads to added expense.

PEM fuel cells operate at temperatures up to about 95° C. with external humidification at elevated pressures being required to maintain proton conductivity. As the membranes dry out at reduced humidity, proton conductivity deteriorates rapidly.

The industry is constantly looking for new membrane material that conduct proton efficiently at reduced humidity levels. It would further be desirable to provide membranes for PEM fuel cells with improved cost and durability characteristics.

SUMMARY

New proton conducting membranes contain poly(arylene sulfide) polymers (PAS) bearing sulfonic acid groups. The membranes are prepared by the solid state sulfonation of films comprising the poly(arylene sulfide) polymers, an olefinic polymer containing epoxy groups, and an elastomer that improves the impact resistance, melt flowability, or flexibility of the film. A preferred poly(arylene sulfide) polymer is poly(p-phenylene sulfide). The membranes can be used in PEM fuel cells operating at temperatures above 95° C., or at low relative humidity. According to methods of the invention, sulfonated poly(phenylene sulfide) (SPPS) films can be provided with a wide range of physical properties, which depend in part on the ion exchange capacity of the films. In particular, the degree or level of sulfonation can be tailored by adjusting reaction conditions such as temperature and time. The SPPS membrane materials can be used as polyelectrolyte membranes in PEM fuel cells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
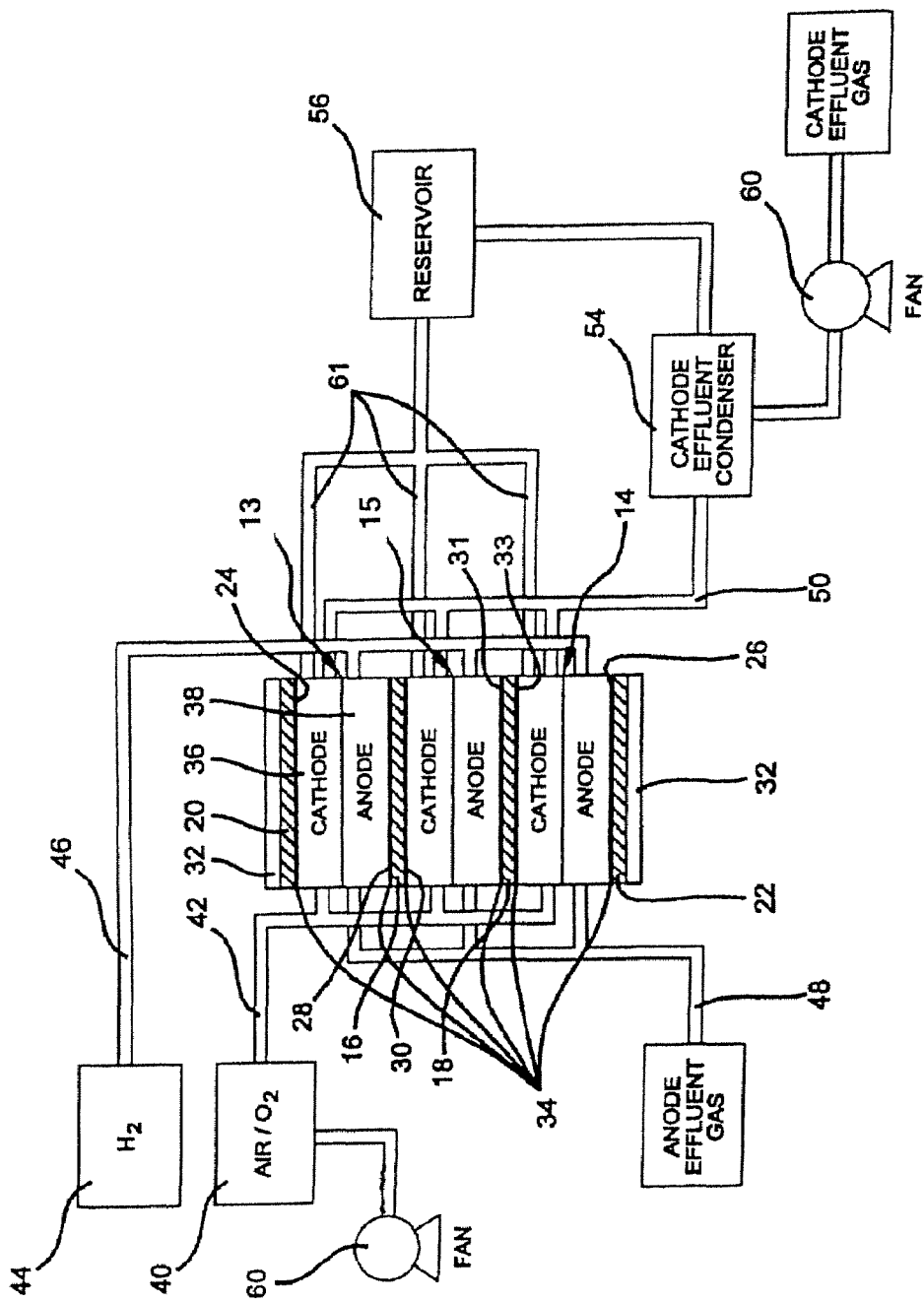
FIG. 1 is a schematic illustration of three cells in a stack in an exemplary fuel cell system.

The following description of the preferred embodiment(s) is merely exemplary in nature and is in no way intended to limit the invention, its application, or uses.

In one embodiment, the invention provides an polyelectrolyte membrane comprising an insoluble sulfonated film. The film is made of three polymeric components, being A) a poly(arylene sulfide), B) an olefinic polymer comprising epoxy groups, and C) an elastomer. The weight ratio of A/(B+C) is from 70/30 to 95/5, and the weight ratio B/C is from 10/90 to 80/20 etc. The poly(arylene sulfides) are a known class of thermoplastic polymer. In various embodiments, the poly(arylene sulfide) comprises polymeric reaction products of polyhalogenated aryl compounds with a source of sulfur. In one embodiment, the polymer has a structure resulting from the reaction of para-dichlorobenzene and sodium sulfide, to form a preferred poly(p-phenylene sulfide).

The polyelectrolyte film can be produced as the reaction product of a sulfonation reagent such as chlorosulfonic acid and an extruded film containing components A) a poly(arylene sulfide), B) an olefinic polymer comprising epoxy groups, and C) an elastomer wherein the weight ratio of A/(B+C) is from 70/30 to 95/5, and the weight ratio B/C is from 10/90 to 80/20 etc. The polyelectrolyte film is insoluble in water, indicating the presence of some level of crosslinking in addition to the incorporated sulfonate groups. The sulfonate content of the polyelectrolyte film, also referred to as the ion exchange capacity (IEC), is preferably at least 0.64 milliequivalents per gram (meq/g). In preferred embodiments, the sulfonate content in meq/g is 1.7 or greater or 1.9 or greater.

The invention also provides a membrane electrode assembly comprising a catalytic anode, a catalytic cathode, and a proton exchange membrane disposed between and in contact with the electrodes. The proton exchange membrane is a polyelectrolyte film such as discussed above. The invention further provides fuel cells containing these membrane electrode assemblies.

In another embodiment, the invention provides a method for making a polyelectrolyte film suitable for use in electrochemical applications such as a fuel cell. The method comprises reacting a sulfonation reagent such as chlorosulfonic acid with an extended film comprising components A) a poly (arylene sulfide), B) an olefinic polymer comprising epoxy groups, and C) an elastomer. In one aspect, the method comprises immersing the extruded film in a solution of chlorosulfonic acid for a time and at a temperature sufficient to incorporate at least 0.64 meq/g $SO_3H$. The temperature and time of the reaction can vary over a wide range, depending upon the concentration of chlorosulfonic acid, the degree of desired sulfonate incorporation, the desired turnaround, etc. For example, the temperature conveniently can range from about 20° C. to about 50° C. and the time from about 1 to about 60 hours. In one embodiment, the immersion of the film in the chlorosulfonic acid solution takes place at room temperature for a time of 10 to 30 hours.

After immersing the film in the chlorosulfonic solution, the film is exposed to water to hydrolyze chlorosulfonic groups to sulfonic acid groups. In one embodiment, the film is exposed to boiling water.

Fuel cells are provided according to the invention by using a polyelectrolyte film made by the above method as a proton exchange membrane. In preferred embodiments, the sulfonate content of the proton exchange membrane is 1.7 meq/g or greater, the liquid water conductivity at 30° C. is greater than 0.1 S/cm, and the conductivity at 100° C. is greater than 0.2 S/cm. In other preferred embodiments, the sulfonate content is 1.9 meq/g or higher.

A PEM fuel cell comprises an anode, a cathode, a proton exchange membrane disposed between the anode and the cathode, an inlet for hydrogen fuel adjacent the anode, and an inlet for oxygen adjacent the cathode. The proton exchange membrane comprises a sulfonated film, as described above, preferably having a sulfonate content of at least 0.64 meq/g $SO_3H$. In various embodiments, the proton exchange membrane is an insoluble sulfonated film made by the method described above.

Suitable films containing components A) a poly(arylene sulfide), B) an olefinic polymer comprising epoxy groups, and C) an elastomer are described below and in U.S. Pat. No. 5,625,002 to Kadoi et al., the disclosure of which is incorporated by reference.

Suitable poly(arylene sulfides) useful as component A) a poly(arylene sulfide) include polymers represented by formula (I)

$$—[Ar—SO_x]_n—\quad(1)$$

wherein Ar represents a divalent aromatic unit and x is an integer from 0 to 2. When x is 1, the polymers may also be described as poly(arylene) sulfoxide. When x is 2, the polymers may be described as poly(arylene) sulfonyl polymers. Preferably x is 0, where the polymers are poly(arylene sulfide) polymers, or PAS. Formula (1) represents polymers that are made of alternating aromatic and sulfur containing units. Non-limiting examples of the divalent aromatic unit represented by Ar includes any of formulas (2)-(11)

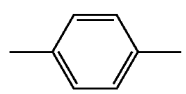

(2)

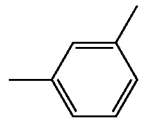

(3)

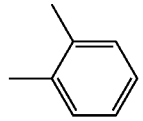

(4)

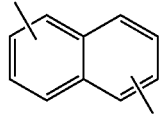

(5)

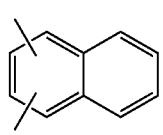

(6)

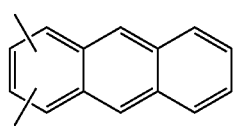

(7)

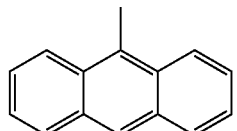

(8)

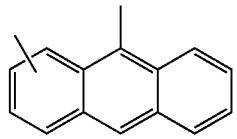

(9)

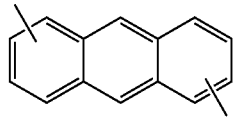

(10)

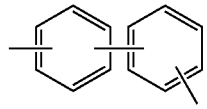

(11)

Preferably Ar is a divalent phenylene unit represented by the formulas (2)-(4) and x is 0 in formula (1).

A preferred poly(arylene sulfide) polymer is poly(p-phenylene sulfide), also known as PPS. PPS has an idealized structure according to the formula

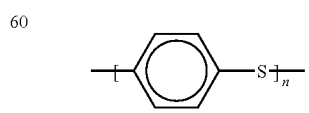

The poly(arylene sulfides) in general and PPS in particular can be prepared by reacting a polyhalogenated arylene compound with a source of sulfur. In one embodiment, a PPS polymer can be formally represented as the reaction product of a para-dihalobenzene such as para-dichlorobenzene and a source of sulfide such as sodium sulfide. To make PPS and other members of the PAS class of polymers other polyhalogenated aromatics can be substituted for the para-dihalobenzenes, and other sources of sulfur can be substituted for the sodium sulfide. Non-limiting examples of halogenated aromatics include para-dichlorobenzene; para-diodobenzene; 1-chloro-4-bromobenzene; 1-chloro-4-iodobenzene; 2,5-dichlorotoluene; 2,5-dichloro-p-xylene; 1-ethyl-4-isopropyl-2,5-dibromobenzene; 1,2,4,5-tetramethyl-3,6-dichlorobenzene; 1-butyl-4-cyclohexyl-2,5-difluorobenzene, and the like.

Mixtures of para- and meta-dichlorobenzene may be used with a source of sulfide to prepare poly(arylene sulfide) useful to make the polyelectrolyte membranes of the invention. In other embodiments, small amounts of 1,2,4-trihaloarylenes, such as 1,2,4-trichlorobenzene may be used. Use of small amounts of the tri-substituted arylenes introduces some branching into the polymeric structure. It is also possible to produce random copolymers containing paraphenylene sulfide and alkyl substituted phenylene sulfides.

In various embodiments, the PAS can comprise up to 30 mole % of recurring units represented by any of the following structural formulae:

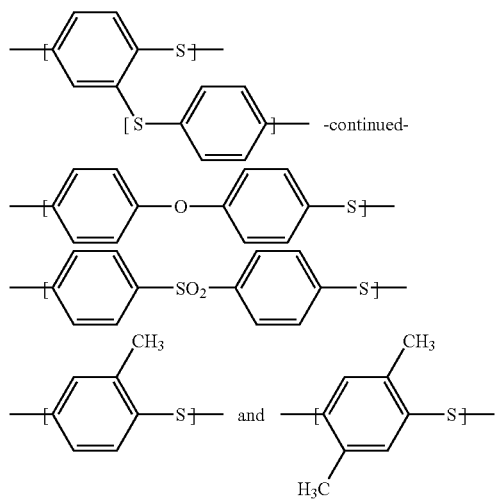

As described above, the kind of PAS used in the present invention is not particularly critical, but in view of the affinity with an olefinic copolymer described below, preferably PAS which has been subjected to a deionizing purification treatment to remove ionic species is used. In various embodiments, the ion content of PAS expressed as the sodium content is not larger than 900 ppm, preferably not larger than 500 ppm. Non-limiting means for reducing the sodium content, include (a) an acid treatment, (b) a hot water treatment, and (c) an organic solvent washing treatment.

Acid treatment is carried out in the following manner. The PAS is dipped in or otherwise exposed to an acid or an aqueous solution of an acid, with appropriate stirring and heating. In a non-limiting example, a powdery PAS is immersed in an aqueous solution of acetic acid of pH 4, heated at 80° to 90° C., and stirred for 30 minutes. To remove the residual acid or salt, the acid-treated PAS is afterwards washed with water or warm water, preferably distilled water.

In a non-limiting example, hot water treatment is conducted by adding a predetermined amount of the PAS to a predetermined amount of water—preferably distilled water—and heating the thus-prepared mixture under stirring in a pressure vessel. Preferably the temperature of the hot water is at least 100° C., more preferably at least 120° C., most preferably higher than 150° C., and especially preferably higher than 170° C. A large proportion of water to PAS is preferred, and in general, a bath ratio of not larger than 200 g of PAS per liter of water is selected.

To avoid degradation of the polymer, the treatment is preferably carried out in an inert atmosphere. To remove the residual components, preferably the PAS that has been subjected to the hot water treatment is washed several times with warm water, maintained at a temperature of lower than 100° C., more preferably at a temperature of at least 10° C. but lower than 100° C.

Alternatively or in addition, organic solvents not having an action of decomposing PAS can be used for washing PAS. Non-limiting examples of solvents include nitrogen-containing polar solvents such as N-methylpyrrolidone, dimethylformamide, dimethylacetamide, 1,3-dimethylimidazolidinone, hexamethylphosphoramide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Of these organic solvents, N-methylpyrrolidone, acetone, dimethylformamide and chloroform are especially preferred. Further, these solvents can be used alone or as a mixture of two or more.

Washing with organic solvent is accomplished by immersing PAS in the organic solvent and heating or stirring as appropriate. The washing temperature for the organic solvent washing is not particularly critical, and an optional temperature can be selected of from room temperature to about 300° C. The washing efficiency is increased with an elevation of the washing temperature, but in general, a satisfactory effect is obtained at a washing temperature of from room temperature to 150° C.

Further, the washing can be carried out under pressure at a temperature higher than the boiling point of the organic solvent in a pressure vessel. The washing time is not particularly critical, and for a batchwise washing, a satisfactory effect is generally obtained if the washing is conducted for at least 5 minutes. Alternatively, the washing can be performed in a continuous manner.

In other embodiments, it is preferred to combine one or two of the other treatments. For example when, a high-boiling-point organic solvent such as N-methylpyrrolidone is used, the residual organic solvent can be easily removed by washing with water or warm water after the organic solvent washing, and preferably distilled water or deionized water is used for this washing.

In various embodiments, a satisfactory effect can be obtained by carrying out the above-mentioned acid treatment or hot water treatment alone. Alternatively a method can be adopted in which the acid treatment is first carried out and the hot water treatment is carried out thereafter, or a method can be adopted in which the hot water treatment is first carried out and then the acid treatment is carried out.

The epoxy group-containing olefinic polymer (B) used in the present invention is an olefinic polymer having an epoxy group in the side chain or main chain. Suitable polymers include olefinic polymers having a glycidyl group such as a glycidyl ester, a glycidyl ether or a glycidyl amine in the side chain, and olefinic polymers having a double bond epoxy-oxidized. A preferred epoxy group-containing olefinic polymer is a copolymer of an α-olefin with a glycidyl ester of an α,β-unsaturated acid. Examples of olefin include ethylene, propylene and butene-1. The glycidyl ester of the α,β-unsaturated acid is represented by the following formula:

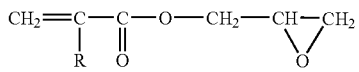

wherein R stands for a hydrogen atom or a lower alkyl group having 1 to 5 carbon atoms Non-limiting examples, include glycidyl acrylate, glycidyl methacrylate and glycidyl ethacrylate. The content of the epoxy group in the epoxy group-containing olefinic polymer (B) is preferably 0.1 to 30% by weight, especially 0.2 to 10% by weight. If the content of the epoxy group is lower than 0.1% by weight, the desired effects cannot be obtained, and if the content of the epoxy group exceeds 30% by weight, gelation tends to occur at the melt kneading with PAS.

A minor amount of another olefinic monomer such as methyl acrylate, methyl methacrylate, acrylonitrile, styrene, vinyl acetate or vinyl ether can be copolymerized with the epoxy group-containing olefinic polymer (B) used in the present invention, as long as the effects of the present invention still can be obtained.

As described above, the impact characteristics can be improved in a PAS composition prepared by incorporating the epoxy group-containing olefinic polymer (B). Preferably, an elastomer (C) is incorporated into the components A) and B) to improve the impact characteristics and enhance the melt flowability and flexibility.

The elastomer (C) used in the present invention preferably does not include an epoxy group and an acid anhydride group and has a flexural modulus not larger than 10,000 kgf/cm². The use of an elastomer containing an acid anhydride group is not preferred because it would tend to raise the melt viscosity of the composition and reduce the moldability of the composition.

The elastomer (C) can be any elastomeric substance that provides the benefits noted above. In preferred embodiments, the elastomer C) is selected from the group consisting of ethylene/propylene copolymers, ethylene/butene copolymers, ethylene/propylene/diene copolymers, hydrogenated styrene/butadiene/styrene block copolymers, copolymers of ethylene with acrylic acid, methacrylic acid or alkyl esters or metal salts thereof, and polyamide elastomers. In various embodiments, other elastomers, such as butadiene/styrene copolymer, butadiene/acrylonitrile copolymer, polybutadiene, ethylene/vinyl acetate copolymer and plasticized polyvinyl chloride are less preferred.

The ethylene/propylene copolymer is a copolymer of ethylene and propylene having a melt flow index of 0.1 to 50 g/10 min as determined according to JIS K-7210, and preferably the ethylene content is 30 to 95% by weight, more preferably 40 to 90% by weight.

A suitable ethylene/butene copolymer is a copolymer of ethylene and butene-1 having a melt index of 0.5 to 50 g/10 min as determined according to JIS K-7210, and preferably the ethylene content is 30 to 95% by weight, more preferably 40 to 90% by weight.

A suitable ethylene/propylene/diene copolymer is a copolymer prepared by introducing a diene compound into an ethylene/propylene copolymer, and the iodine value as the factor indicating the quantity introduced of the diene compound is generally 5 to 30. As the diene compound to be introduced, there can be mentioned hexadiene, norbornadiene, and ethylidene norbornene.

A suitable hydrogenated styrene/butadiene/styrene block copolymer is a copolymer obtained by hydrogenating a part or all of the intermediate butadiene blocks of a styrene/butadiene/styrene copolymer elastomer, for example, according to the process disclosed in the specification of U.S. Pat. No. 3,413,323. The melt flow index of the copolymer is 0.5 to 100 g/10 min, as determined according to JIS K-7210, and the styrene content is preferably 5 to 60 mole %, more preferably 10 to 50 mole %.

Suitable copolymers of ethylene with acrylic acid, methacrylic acid, and alkyl esters in which the alkyl group has 1 to 5 carbon atoms, and metal salts thereof, include ethylene/acrylic acid ester copolymers such as an ethylene/methyl acrylate copolymer, an ethylene/ethyl acrylate copolymer, an ethylene/propyl acrylate copolymer and an ethylene/butyl acrylate copolymer, ethylene/methacrylic acid ester copolymers such as an ethylene/methyl methacrylate copolymer, an ethylene/ethyl methacrylate copolymer, an ethylene/propyl methacrylate copolymer, and an ethylene/butyl methacrylate copolymer, an ethylene/acrylic acid copolymer and an ethylene/methacrylic acid copolymer, and their metal salts such as Na, Zn, K, Ca and Mg salts.

Suitable polyamide elastomers include block copolymer elastomers having hard segments of a polyamide component and soft segments of a polyether component and/or a polyester component. Examples of the polyamide component, include $-(NH-R'-CO-)_{\overline{n}}$ and $-(NH-R''-NHCO-R'''-CO-)_{\overline{n}}$ (in which R', R'' and R''' stand for an alkylene group having 2 to 15 carbon atoms or a substitution product thereof). Examples of the polyether component, include $-(OR-)_{\overline{n}}$ (in which R stands for an alkylene group having 2 to 15 carbon atoms or a substitution product thereof). Examples of the polyester component, include $-(OR'-CO-)_{\overline{n}}$ and $-(O-R''-OCO-R'''-CO-)_{\overline{n}}$ (in which R', R'', and R''' stand for an alkylene group having 2 to 15 carbon atoms or a substitution product thereof). The polyamide elastomer further includes random copolymers of nylon 6, nylon 66, nylon 610, nylon 11 and nylon 12.

Of the foregoing elastomers (C), an ethylene/propylene copolymer, an ethylene/butene copolymer, an ethylene/acrylic acid copolymer, an ethylene/methacrylic acid copolymer, an ethylene/acrylic acid ester copolymer, and an ethylene/methacrylic acid ester copolymer are preferred.

The mixing ratio among the PAS (A), the epoxy group-containing olefinic copolymer (B), and the elastomer (C) is preferably within a range such that the (A)/[(B)+(C)] weight ratio is from 55/45 to 99/1, more preferably from 70/30 to 95/5, and the (B)/(C) weight ratio is from 95/5 to 5/95, more preferably from 80/20 to 10/90. If the ratio of the component (A) is lower than about 55% by weight, the strength and rigidity of the composition tend to be lowered, and if the ratio of the component (C) based on the sum of the components (B) and (C) is lower than 5% by weight, there tends to be little improvement of the melt flowability.

The method of preparing the film is not particularly critical. In one embodiment, PAS (A), the epoxy group-containing olefinic polymer (B), and the elastomer (C), are melt-kneaded at a temperature higher than the melting point of the PAS in an extruder, and the resulting kneaded mixture is pelletized. Thereafter a film can be extended or solution cast according to known techniques.

In general, preferably the melt-kneading temperature is higher than 280° C., to sufficiently melt the composition, and lower than 340° C. to prevent a thermal deterioration and gelation of the olefinic copolymer (B). Namely, preferably the melt-kneading temperature is 280° to 340° C.

A suitable film containing the three components A) a poly(arylene sulfide), B) an olefinic polymer comprising epoxy groups, and C) an elastomer is sold under the Ryton® 16C and XTEL-XE trade names by Chevron-Phillips.

Because PAS and PPS have limited solubility in many solvents, it is sometimes difficult or impossible to produce solution cast films of compositions containing them. However, the polymers are melt processable, so in a preferred embodiment extruded films are produced. Non-limiting examples of extruded films include 0.5 mil, 1 mil, and 2 mil films. PAS is insoluble in concentrated sulfuric acid. but readily disperses in oleum (fuming sulfuric acid consisting of 30% by weight $SO_3$ in sulfuric acid) and in chlorosulfonic acid ($ClSO_3H$). The reaction with oleum leads to highly sulfonated polymers that are soluble in water, while reaction with $ClSO_3H$ leads to the insoluble films of the invention.

PAS reacts with chlorosulfonic acid to introduce the chlorosulfonyl group ($—SO_2Cl$) onto aromatic rings of the polymers. The polymer-bound chlorosulfonyl groups are subsequently converted to sulfonic acid groups upon hydrolysis, for example by exposing the sulfonated films to boiling water for one hour. The products derived from reaction with the chlorosulfonic acid are insoluble. This is believed to be due in part to a crosslinking reaction involving the formation of sulfone groups ($—SO_2—$). The crosslinking provides advantages for the chlorosulfonation of preformed PAS films, because the crosslinking reaction reinforces physical properties and prevents the films from dissolving in water.

In various embodiments, a polyelectrolyte film suitable for use as a proton exchange membrane in a fuel cell is made by reacting an extruded PPS film with chlorosulfonic acid. The films contain components A) a poly(arylene sulfide), B) an olefinic polymer comprising epoxy groups, and C) an elastomer, as described above. For example, preformed films are immersed in a solution of chlorosulfonic acid in a solvent such as dichloromethane or 1,2-dichloroethane. Immersion occurs for a time and at a temperature sufficient to incorporate a desired amount of sulfonate or chlorosulfonyl groups onto the aromatic rings of the polymer. In one embodiment, at least 0.64 meq $SO_3H/g$ is incorporated. After immersing the film in the chlorosulfonic solution for a sufficient time, the film is thereafter exposed to water. This step converts the chlorosulfonyl groups to sulfonic acid groups by hydrolysis. The hydrolysis step can be carried out at elevated temperatures, such as in boiling water, to provide faster reaction kinetics.

After hydrolysis, the amount of sulfonic acid groups incorporated into the film can be determined by conventional means, such as titration with sodium hydroxide to a pH of 7. The number of mL of sodium hydroxide solution required to titrate the film to a pH of 7 is converted into meq $SO_3H/g$ of film by conventional methods.

Useful polyelectrolyte membranes in general have liquid conductivity measured in S/cm at 30° C. or 100° C. that are comparable to those of conventional perfluorosulfonic acids used as proton exchange membranes in fuel cells. For example, the commercially available proton exchange membrane, Nafion 112 from DuPont exhibits a liquid conductivity at 30° C. of 0.129 S/cm at 30° C. and 0.259 S/cm at 100° C. Such conductivity measurements may be made as described by Zawodzinski et al., J. Phys. Chem. 95 (15) 6040 (1991). The membrane is conditioned in 100° C. water for 1 hour and the measurement cell is submersed in 25° C. deionized water during the experiment. The membrane impedance (real) is taken at zero imaginary impedance.

According to another embodiment of the invention, a fuel cell is provided that contains the insoluble sulfonated film described above as a proton exchange membrane. Such fuel cells typically contain a catalytic anode, a catalytic cathode, and a proton exchange membrane disposed between the anode and cathode. The fuel cell also contains an inlet adjacent the anode for providing hydrogen fuel to the anode side of the fuel cell, and an inlet adjacent the cathode for providing oxidant gas (oxygen) to the cathode.

Referring generally to FIG. 1, three individual proton exchange membrane (PEM) fuel cells according to one preferred embodiment of the present invention are connected to form a stack. Each PEM fuel cell has membrane-electrode-assemblies (MEA) 13,15,14, respectively, separated from one another by electrically conductive, impermeable separator plates 16,18, and further sandwiched between terminal separator plates 20,22 at each end of the stack with each terminal plate 20,22 having only one electrically active side 24,26. An individual fuel cell, which is not connected in series within a stack, has a separator plate, with only a single electrically active side. In a multiple fuel cell stack, such as the one shown, a preferred bipolar separator plate 16 typically has two electrically active sides 28,30 respectively facing a separate MEA 13,15 with opposite charges that are separated, hence the so-called "bipolar" plate. As described herein, the fuel cell stack has conductive bipolar separator plates in a stack with multiple fuel cells; however the present invention is equally applicable to conductive separator plates within a stack having only a single fuel cell.

The MEAs 13,15,14 and bipolar plates 16,18 are stacked together between aluminum clamping plates 32 at each end of the stack and the end contact terminal plate elements 20,22. The end contact terminal plate elements 20,22, as well as working faces 28,30 and 31,33 of both bipolar separator plates 16,18, contain a plurality of gas flow channels (not shown) for distributing fuel and oxidant gases (i.e., $H_2$ & $O_2$) to the MEAs 13,15,14. Nonconductive gaskets or seals (not shown) provide seals and electrical insulation between the several components of the fuel cell stack. Gas-permeable conductive diffusion media 34 press up against the electrode faces of the MEAs 13,15,14. When the fuel cell stack is assembled, the conductive gas diffusion layers 34 assist in even distribution of gas across the electrodes of the MEAs 13,15,14 and also assist in conducting electrical current throughout the stack.

An inlet for oxygen adjacent the cathode and an inlet for hydrogen adjacent the anode are also provided. Oxygen is supplied to the cathode side 36 of each fuel cell in the stack from storage tank 40 via appropriate supply plumbing 42 to provide an inlet for oxygen adjacent the cathode, while hydrogen is supplied to the anode side 38 of the fuel cell from storage tank 44, via appropriate supply plumbing 46 to provide an inlet for hydrogen adjacent the anode. Alternatively, air may be supplied to the cathode side 36 from the ambient, and hydrogen to the anode 38 from a methanol or gasoline reformer, or the like. Exhaust plumbing for the anode side 48 and the cathode side 50 of the MEAs 13,15,14 are provided. On the cathode side, the plumbing defines an exit side. Gas flow into and out of the stack is typically facilitated by fans 60, such as those shown in the exemplary configuration of FIG. 1. Any means of transporting fluids into and out of the stack are feasible, and the configuration and number of fans shown is merely exemplary and not limiting.

As shown in FIG. 1, the cathode effluent 50 is routed from the stack to a condenser 54, which serves to liquefy and recover the vapors in the cathode effluent stream 50. The liquids (e.g. water) are transported to a reservoir 56 for storage. The effluent stream 50 from the cathode has a high concentration of vapor (water vapor, for example) due to the water generated by the electrochemical reactions occurring within the MEA and any additional water introduced for cooling. The water evaporates due to pressure and temperature conditions within the fuel cell. Preferably, the effluent stream is saturated with vapor (e.g. in the case of water at approximately 100% relative humidity). As shown, the supply conduits 61 provide water to the cathode side of each MEA 13,15,14 by interconnecting the reservoir 56 to the fuel cells in the stack. A pump (not shown) may optionally be included in the system to facilitate the transport of the liquid from the reservoir 56 to the stack, or through other areas of the system.

The invention has been described above with respect to various preferred embodiments. Further non-limiting examples are given in the examples that follow.

EXAMPLES

Example 1

Sulfonation of PPS Films with Chlorosulfonic Acid at 25° C.

Dichloromethane (50 mL, 66 gm) and chlorosulfonic acid (between 0.7 and 1.4 gms) are added sequentially to a wide mouth glass bottle (120 mL capacity, 2 inch diameter). 10 mL of this solution are added to dichloromethane (50 mL, 66 gms) in a wide mouth glass jar (410 mL, 3 inch diameter). To this mixture is added a 1 mil (0.001 inch, 0.0025 cm) colorless film of Ryton® 16C or XTEL-XE (Chevron-Phillips) consisting of a circle with a diameter of 2.75 inches and weighing between 0.14 and 0.18 gm. The jar is sealed with a screw cap lid and the film is allowed to react for various amounts of time at 25° C. while being suspended in the reaction solution. The insoluble colorless film is observed to turn blue-green and then black after several seconds of immersion in the reaction solution. After a variable time of reaction, the black film is then added to distilled water (200 mL) and the film turned light yellow. The film is washed extensively with more water (about 2 liter) and then boiled in water (250 mL) for about 1 hour. The film is then suspended in 1 molar sodium chloride (220 mL) and the amount of sulfonation is determined by titration with 0.01 molar sodium hydroxide to a pH 7 end point. The amount of sulfonation (in meq/g $SO_3H$) with reaction time is 0.64 (1 hour), 1.27 (6.5 hours), 1.71 (16 hours), 1.86 (24 hours), 2.31 (48 hours), and 2.6 (60 hours). The sulfonated film with 1.9 meq/g $SO_3H$ had a liquid water proton conductivity of 0.131 and 0.337 S/cm at 33° C. and 100° C. respectively.

Example 2

Sulfonation Reaction at 40° C.

The reaction described above is repeated at 40° C. After 4 hours, the amount of sulfonation is determined by titration with 0.01 molar sodium hydroxide to be 2.36 meq/g $SO_3H$. The physical properties of the film are better than those with membranes similar ion exchange capacities made at 25° C.

Example 3

Polyelectrolyte films of Examples 1 and 2 are flexible enough to be handled and made into MEA's and fuel cells according to known methods. Comparable films made by chlorosulfonating a film containing component A) but not components B) or C) are too brittle for subsequent use in making fuel cells.

Although the invention has been described above with respect to various preferred embodiments, the invention is not limited to the embodiments disclosed. Variations and modifications as will occur to those of skill in the art upon reading the disclosure are also included in the scope of the invention, which is limited only by the appended claims.

What is claimed is:

1. A polyelectrolyte membrane, comprising an insoluble sulfonated film having a sulfonate content in meq $SO_3H/g$ of at least 0.64, wherein the film comprises
   A) a poly(arylene sulfide),
   B) an olefinic polymer comprising functional epoxy groups, and
   C) an elastomer
wherein the weight ratio of A/(B+C) is from 70/30 to 95/5, and the weight ratio B/C is from 10/90 to 80/20.

2. A polyelectrolyte membrane, according to claim 1 wherein the poly(arylene sulfide) comprises poly(p-phenylene sulfide).

3. A polyelectrolyte membrane according to claim 1, wherein the sulfonate content is 1.7 meq/g or greater.

4. A polyelectrolyte membrane according to claim 1, wherein the sulfonate content is 1.9 meq/g or greater.

5. A polyelectrolyte membrane according to claim 1, comprising the reaction product of chlorosulfonic acid and an extruded film comprising the poly(arylene sulfide), the olefinic polymer and the elastomer.

6. A film according to claim 5, wherein the poly(arylene sulfide) is poly(p-phenylene sulfide).

7. A membrane electrode assembly comprising a proton exchange membrane film according to claim 1.

8. A fuel cell comprising a membrane electrode assembly comprising a polyelectrolyte membrane according to claim 7.

9. A film according to claim 1, comprising sulfone crosslinking groups.

10. A polyelectrolyte membrane according to claim 1, wherein the olefinic polymer B) has epoxy groups in side chains.

11. A polyelectrolyte membrane according to claim 1, wherein the olefinic polymer has epoxy groups in the main chain.

12. A polyelectrolyte membrane according to claim 1, wherein the olefinic polymer B) has a glycidyl group in the side chain.

13. A polyelectrolyte membrane according to claim 12, wherein the olefinic polymer comprises a copolymer of a glycidyl ester.

14. A polyelectrolyte membrane according to claim 12, wherein the olefinic polymer comprises a copolymer of a glycidyl ether.

15. A polyelectrolyte membrane according to claim 12, wherein the olefinic polymer comprises a copolymer of a glycidyl amine.

16. A polyelectrolyte membrane according to claim 12, wherein the olefinic polymer comprises a copolymer of glycidyl methacrylate.

17. A polyelectrolyte membrane according to claim 12, wherein the olefinic polymer comprises a copolymer of glycidyl ethacrylate.

18. A polyelectrolyte membrane according to claim 12, wherein the olefinic polymer comprises a copolymer of glycidyl acrylate.

* * * * *